United States Patent [19]
West et al.

[11] Patent Number: 6,124,949
[45] Date of Patent: Sep. 26, 2000

[54] METHOD AND APPARATUS FOR PREVENTING AN ORIGINATING FACSIMILE MACHINE FROM GOING ON-HOOK PRIOR TO CALL COMPLETION DUE TO SETUP DELAYS

[75] Inventors: Stephen Matthew West, Arlington; Craig Lawrence Lutgen, Fort Worth, both of Tex.

[73] Assignee: Motorola, Inc., Schaumburg, Ill.

[21] Appl. No.: 09/172,561

[22] Filed: Oct. 14, 1998

[51] Int. Cl.[7] .............................. H04N 1/00; H04M 11/00
[52] U.S. Cl. ..................... 358/434; 379/100.17; 455/557
[58] Field of Search ......................... 379/100.09, 100.06, 379/100.17; 358/434, 439, 442, 431; 455/557

[56] References Cited

U.S. PATENT DOCUMENTS

| | | | |
|---|---|---|---|
| 5,282,238 | 1/1994 | Berland | 358/431 |
| 5,287,402 | 2/1994 | Nakajima | 379/100 |
| 5,790,641 | 8/1998 | Chan et al. | 379/100.17 |
| 5,883,723 | 3/1999 | Sakata | 358/442 |
| 5,949,861 | 9/1999 | Chan et al. | 379/100.17 |

*Primary Examiner*—Kimberly A. Williams
*Attorney, Agent, or Firm*—Mario J. Donato, Jr.

[57] ABSTRACT

A method and apparatus is disclosed for preventing an originating facsimile machine from going on hook prior to call completion due to setup delays. The originating facsimile machine includes a start connect timer having a predetermined time duration. The method and apparatus include detecting a facsimile call origination from the originating facsimile machine, anticipating expiration of the start connect timer, and sending a benign signal to the originating facsimile machine prior to expiration of the start connect timer, wherein the benign signal allows the originating facsimile machine to receive a digital identification signal message from a terminating facsimile machine prior to expiration of the start connect timer.

16 Claims, 4 Drawing Sheets

6,124,949

1

METHOD AND APPARATUS FOR PREVENTING AN ORIGINATING FACSIMILE MACHINE FROM GOING ON-HOOK PRIOR TO CALL COMPLETION DUE TO SETUP DELAYS

FIELD OF THE INVENTION

The present invention relates generally to facsimile telecommunications systems, and more particularly, to a method and apparatus for preventing an originating facsimile machine from going on-hook prior to call completion to a terminating facsimile machine due to setup delays.

BACKGROUND OF THE INVENTION

Before a facsimile image is transmitted from an originating facsimile machine to a terminating facsimile machine, the originating and terminating facsimile machines send messages between the machines to negotiate transmitting and receiving modes for transmitting facsimile data. Such transmitting and receiving modes specify a set of parameters that are agreed upon prior to transmitting facsimile data. These parameters may include a data bit rate, a page size, the number of pixels per line, the number of lines per page, and whether or not any fill characters are added to a line so that the terminating facsimile machine has time to print each line. However, prior to the negotiation of transmitting and receiving modes, a negotiation for call completion occurs between the originating facsimile machine and the terminating facsimile machine. This call completion negotiation may pose a problem in systems having long call setup times. The call setup times may be effected by the number of rings on the terminating facsimile machine before it picks up, switching times related to a PBX switch, switching times related to international calls, and the like. In addition, systems having a variable data transmission time add additional delays on top of those previously mentioned, which in turn may cause the call completion rate between the originating and terminating facsimile machines to be undesirably low.

When an originating facsimile machine and a terminating facsimile machine need to transmit facsimile data, the negotiation for call completion between the originating facsimile machine and the terminating facsimile machine, as well as the negotiation of transmitting and receiving modes, becomes important to the success of sending a facsimile image. An example of a medium having a variable data transmission time is a wireless medium, which may, for example, be used to provide wireless local loop telephone service to businesses and homes. The reason this wireless communications system may be considered a medium having a variable data transmission time is that the wirelessly transmitted data may be influenced by noise or interference from other users, and thus may need to be retransmitted to correct errors. This retransmission takes time and may introduce delay in the overall communications link between the originating and terminating facsimile machines. The Internet or other similar network is another example of a communication medium having a variable data transmission time. Such mediums do not have a low, fixed time of data propagation. Other examples include a medium that allows random quantities of data with variable periods of idle or null characters to be synchronously transmitted.

In a wireless local loop system, telephones, facsimile machines, and other terminal equipment at the customer's site may be connected to a device frequently referred to as a fixed wireless terminal (FWT). The fixed wireless terminal provides basic telephone local loop service through a wireless or radio link. In many service areas, telephone service may be provided wirelessly at a fraction of the cost of traditional wireline infrastructure. Other benefits of wireless local loop systems are rapid deployment time, the ability to cover a large area, high capacity, and lower operating and maintenance costs.

Many wireless local loop systems are implemented with a digital air interface between the fixed wireless terminal and a base station transceiver. This means that signals from a facsimile machine connected to the fixed wireless terminal must be converted from an analog signal to a digital signal before transmission over the air. Similarly, digital signals received from the base transceiver must be converted to analog signals in the fixed wireless terminal before they are sent to a connected facsimile machine. All of these conversions may introduce delay into the system. In addition, the time and number of access probes required to access the call is variable, and may introduce a delay. To further complicate the problem, the originating facsimile machine expects a timely reply from the terminating facsimile machine after dialing is completed on originated calls.

Most facsimile machines include a start connection timer having a predetermined time duration which is activated as soon as dialing is completed on originated calls. This start connection timer will disconnect the call if an HDLC message is not received by the originating facsimile machine from the terminating facsimile machine prior to the expiration of the connection timer. HDLC messages are sent between facsimile machines in accordance with the T.30 procedures for Document Facsimile Transmission in the General Switched Telephone Network specification, which is promulgated by the International Telecommunication Union (ITU). Typically, the connection timer value is based on wireline timing characteristics. As discussed above, wireless calls introduce additional call set-up delays which can result in the connection timer expiring and the call being dropped by the originating facsimile machine prior to the call being completed between the originating and terminating facsimile machines.

While the foregoing discussion relates to a wireless communication link in a wireless local loop communications system, other communications media having either fixed and/or variable data transmission times may have similar problems supporting a facsimile data transmission session. Therefore, there is a need for an improved method and apparatus for preventing an originating facsimile machine from going on-hook prior to call completion due to setup delays.

SUMMARY OF THE INVENTION

According to an aspect of the present invention, the foregoing need is addressed by a method of preventing an originating facsimile machine from going on hook due to setup delays. The originating facsimile machine includes a start connect timer having a predetermined time duration. The method comprises the steps of detecting a facsimile call origination from the originating facsimile machine, anticipating expiration of the start connect timer, and sending a benign signal to the originating facsimile machine prior to expiration of the start connect timer, wherein the benign signal allows the originating facsimile machine to receive a digital identification signal message from a terminating facsimile machine prior to expiration of the start connect timer.

According to another aspect of the present invention, an apparatus adapted to prevent an originating facsimile machine from going on hook due to setup delays comprises a facsimile call origination detector adapted to detect a facsimile call origination from the originating facsimile machine. Means for anticipating expiration of the originating facsimile machine's start connect timer is provided, and a benign signal sender adapted to send a benign signal to the originating facsimile machine prior to expiration of the start connect timer is included, wherein the benign signal allows the originating facsimile machine to receive a digital identification signal message from a terminating facsimile machine prior to expiration of the start connect timer.

Advantages of the present invention will become readily apparent to those skilled in the art from the following description of the preferred embodiment of the invention which has been shown and described by way of illustration. As will be realized, the invention is capable of other and different embodiments, and its details are capable of modifications in various respects. Accordingly, the drawings and description are to be regarded as illustrative, and not as restrictive.

DETAILED DESCRIPTION OF THE INVENTION

Figure 1:
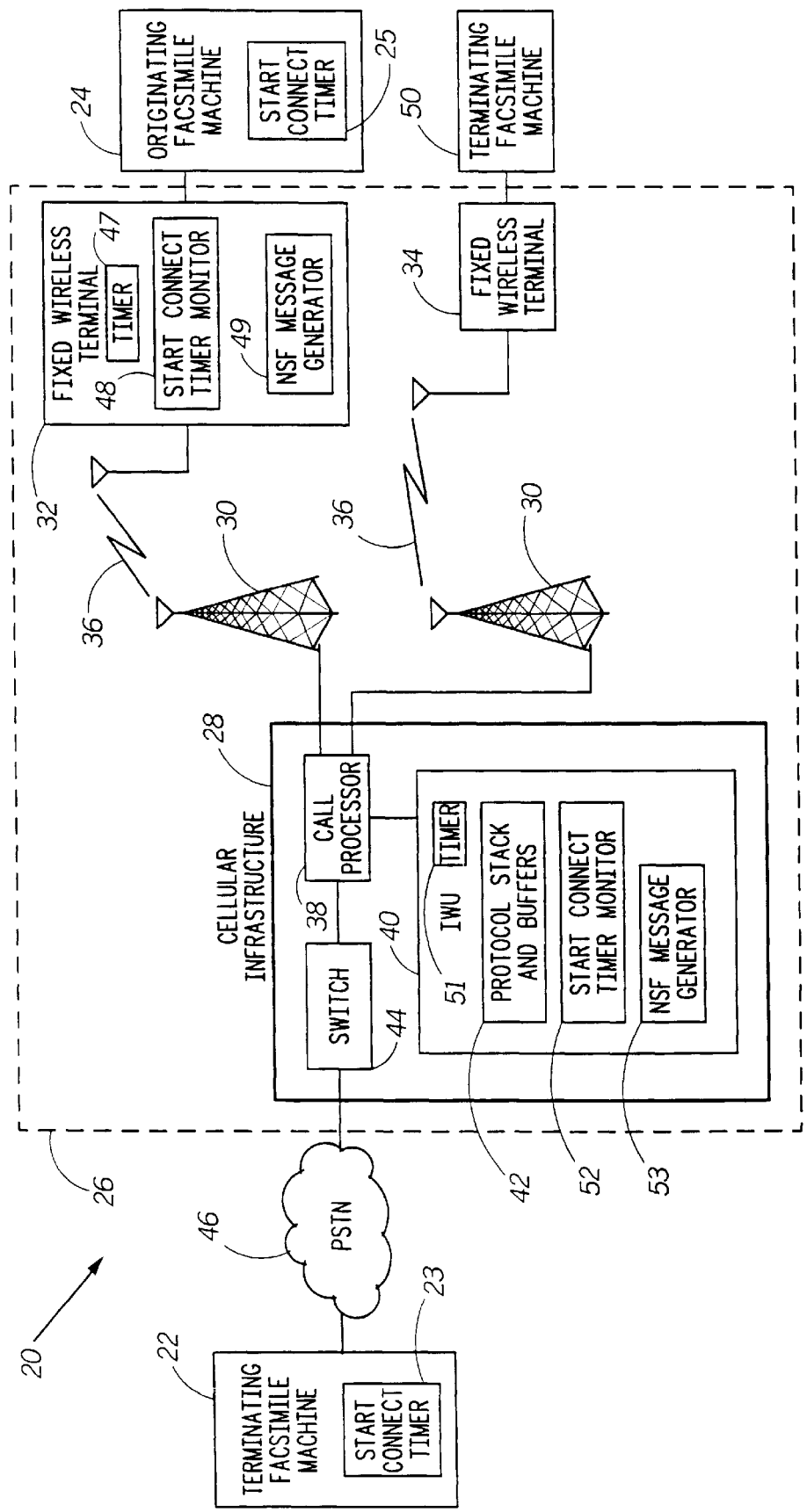
FIG. 1 is a block diagram of a facsimile telecommunications system in accordance with the preferred embodiment of the present invention depicting originating and terminating facsimile machines coupled through a communication medium having a variable data transmission time.

With reference now to FIG. 1, there is depicted a telecommunications system 20, wherein originating facsimile machine 24 is coupled to terminating facsimile machine 22 via a communications link having a plurality of communications media, including a medium having a variable data transmission time. In the example shown in FIG. 1, the medium having a variable data transmission time is a wireless medium that may delay data transmission by retransmitting a data packet that was received erroneously, or that may be susceptible to long call setup times. In FIG. 1, the wireless medium is more particularly implemented with wireless local loop system 26.

Wireless local loop system 26 may include cellular infrastructure 28 coupled to base station transceivers 30. Base station transceivers 30 are typically located throughout a communications system service area so that they may communicate with fixed wireless terminals 32 and 34, also located throughout the service area, via air interface 36. In a preferred embodiment, air interface 36 is a code division multiple access (CDMA) air interface implemented in accordance with IS-95, which is a standard promulgated by Electronic Industries Association/Telecommunications Industry Association (EIA/TIA). While an IS-95 CDMA air interface is shown in the example of FIG. 1, other air interfaces or communication media having a variable data transmission time may be used. Examples of other communication media having a variable data transmission time include Groupe Speciale Mobile (GSM) and other similar digital air interfaces, and the Internet which uses Transmission Control Protocol/Internet Protocol (TCP/IP).

Within cellular infrastructure 28, call processor 38 handles many of the functions needed to implement a cellular communications system. For example, call processor 38 may include an interworking transcoder voice function, a mobility management function, an error detection and correction function, and other such functions detailed in the communication media specification.

Also within cellular infrastructure 28 is interworking function (IWF) or interworking unit (IWU) 40, which is coupled to call processor 38. Interworking unit 40 is a device for bridging or interfacing one communication format with another. It is typically responsible for converting data conforming to one data communications standard to data conforming to another. With particular relevance to the present invention, interworking unit 40 is a device within cellular infrastructure 28 that processes facsimile image data and facsimile messages in accordance with specification IS-707-A promulgated by ITU. Thus, when call processor 38 receives data that it is not designed to process (e.g., data other than voice data), call processor 38 routes such data to interworking unit 40 so that it is properly processed. Although shown separately in the example of FIG. 1, interworking unit 40 may be more closely integrated with call processor 38. It is shown separately here to emphasize the functions of the present invention.

Within interworking unit 40, appropriate protocol stacks and buffers 42 are created, maintained, and operated in order to properly transfer facsimile messages and image data in accordance with specification IS-707-A.

Switch 44 within the cellular infrastructure 28 is used to selectively couple elements with call processor 38 to the public switched telephone network (PSTN) 46. Switch 44 may also be used to connect elements in call processor 38 to the proper interworking unit 40.

As part of the overall communications link, fixed wireless terminal 32 provides local loop telephone service to originating facsimile machine 24. The communications media in this part of the link is preferably twisted pair telephone wire. In another part of the link cellular infrastructure 28, base station transceiver 30, and air interface 36 work together to wirelessly couple fixed wireless terminal 32 to the public switched telephone network 46.

The part of the communications link between fixed wireless terminal 32 and the output of switch 44 may be referred to as a variable data transmission time media. The part of the communications link between the output of switch 44 and terminating facsimile machine 22 may be considered a fixed or constant data transmission time media. Although a preferred embodiment is described as including a variable data transmission time media and a constant data transmission time media, other suitable configurations can readily and easily be used without deviating from the spirit and scope of the present invention as defined by the appended claims. For example, one skilled in the art would recognize that any combination of constant data transmission time media, such as land line data transmission, and/or variable data transmission time media, such as wireless data transmission, could be substituted for the above-referenced configuration, in that the particular problem the present invention is directed to overcoming is providing greater call completion rates in environments having long setup delays.

According to an important aspect of the embodiment shown in FIG. 1 of the present invention, fixed wireless terminal 32 includes timer 47, start connect timer monitor 48, and NSF message generator 49, and originating facsimile machine 24 includes start connect timer 25, all of which play an important function in the negotiation of call completion between originating facsimile machine 24 and terminating facsimile machine 22, as described in greater detail below.

Also note that if terminating facsimile machine 22 was changed to an originating facsimile machine (i.e. facsimile machine 22 communicating with facsimile machine 50), start connect timer monitor 52 and NSF message generator 53 in IWU 40 may be used according to the present invention to negotiate call completion modes between "originating" facsimile machine 22 and terminating facsimile machine 50.

Although fixed wireless terminals 32 and 34 are not shown the same way in FIG. 1, they may be implemented the same way, or may be implemented with the same fixed wireless terminal. In addition, if fixed wireless terminal 34 were connected to an originating facsimile machine, then fixed wireless terminal 34 would contain a start connect timer monitor and an NSF message generator, and fixed wireless terminal 32 need not necessarily contain start connect timer monitor 48 and NSF message generator 49.

Figure 4:
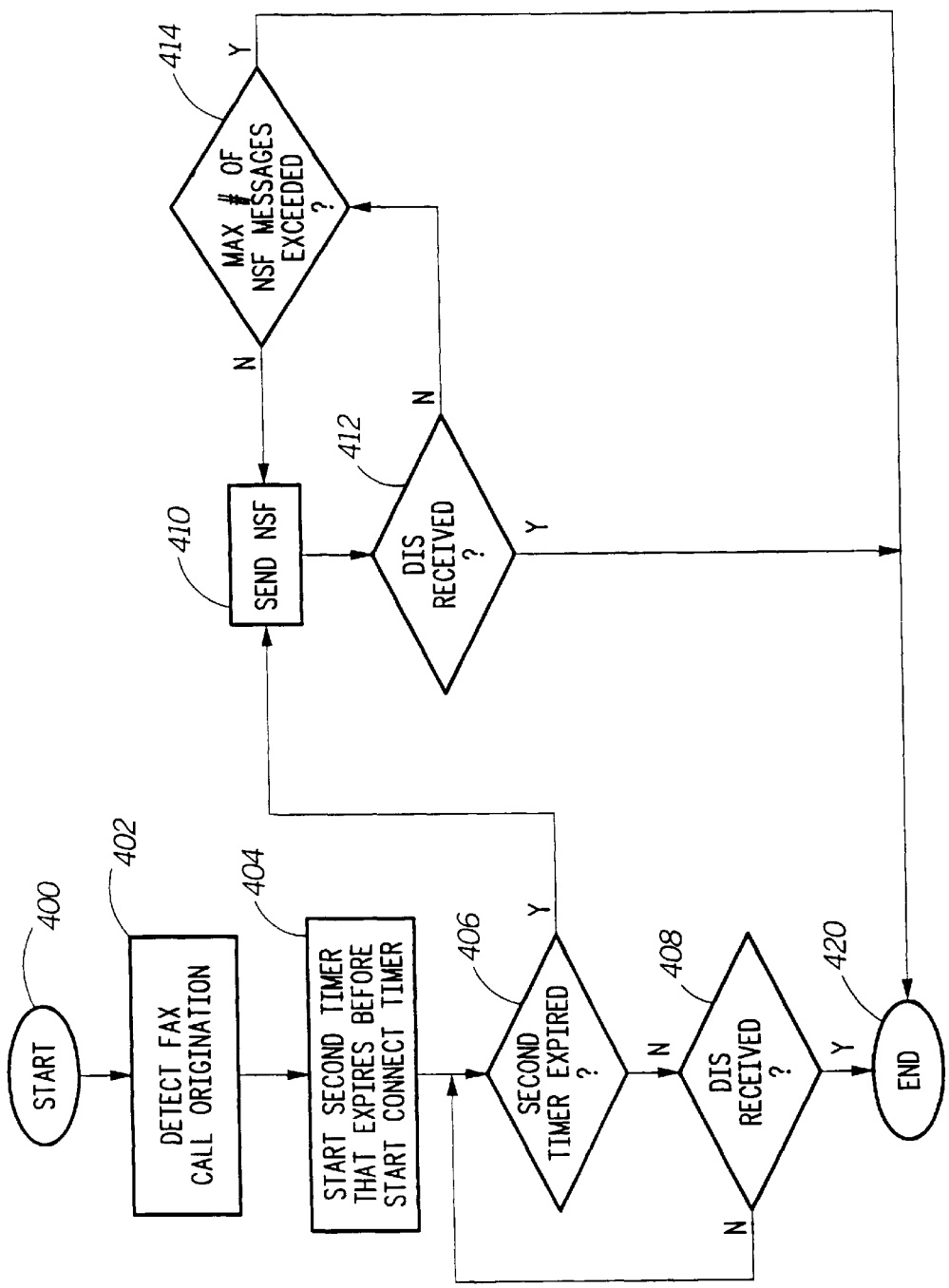
FIG. 4 is a high level flowchart that illustrates the operation of the method and system of the present invention.

With reference now to FIG. 4, there is depicted a logical flowchart of the process of negotiating call completion between originating facsimile machine 24 and terminating facsimile machine 22 for transmitting facsimile data via a medium having a variable data transmission time according to the method and system of the present invention. Note that the process shown in the flowchart of FIG. 4 takes place within a device or devices located in a communication link between an originating facsimile machine and a terminating facsimile machine. This device may be, for example, a fixed wireless terminal in a wireless local loop system, or an interworking unit in the cellular infrastructure of a wireless local loop system. The process shown may also be executed in devices in communication links over a network, such as a local area network or the Internet.

According to an embodiment of the present invention, the communications link between the originating facsimile machine and the terminating facsimile machine includes more than one media. These different media are coupled together by interworking devices to form the overall communications link between the originating facsimile machine and the terminating facsimile machine. The steps illustrated in the flowchart depict operations performed in such devices to influence the negotiation of call completion modes to improve facsimile performance when using such a mixed media communications link. However, it will be appreciated by those skilled in the art that the communications link between the originating facsimile machine and the terminating facsimile machine need not include more than one media and still fall within the scope of the present invention.

As shown, the process begins at block 400, and thereafter passes to block 402 wherein the device detects a facsimile call origination from the originating facsimile machine. Note that this step, as well as many of the following steps in FIG. 4, may be more clearly understood with reference to FIG. 2, which illustrates the flow of messages in accordance with the method and system of the present invention. Thus, in response to detecting a facsimile call origination from the originating facsimile machine in the fixed wireless terminal, as illustrated at reference numeral 202 in FIG. 2, the process starts a second timer having a time duration less than that of the start connect timer time duration, as illustrated in block 404 in FIG. 4, and as shown at reference numerals 204 and 206 in FIG. 2.

As previously discussed, most facsimile machines start a connection timer as soon as dialing is completed on originated calls. This connection timer will disconnect the call if an HDLC message is not received by the originating facsimile machine from the terminating facsimile machine prior to the expiration of the connection timer. Therefore, some means for anticipating the expiration of the start connect timer is necessary so that appropriate action may be taken prior to the connect timer's expiration. In the preferred embodiment, a second timer is coupled to the FWT and/or the IWU, the second timer having a time duration less than that of the start connect timer, wherein a benign signal is sent to the originating facsimile machine after the time duration of the second timer expires but prior to the expiration of the start connect timer. Although a preferred embodiment is described as including a second timer, other suitable configurations can readily and easily be used without deviating from the spirit and scope of the present invention as defined by the appended claims. For example, one skilled in the art would recognize that a controller adapted to monitor the start connect timer, such as start connect timer monitors 48 and 52 shown in FIG. 1, may be used either singly or in combination with the second timer and still fall within the scope of the present invention.

Next, a determination is made whether the second timer has expired, as illustrated at block 406. If the second timer has not expired, then flow proceeds to block 408, wherein a determination is made whether a Digital Identification Signal (DIS) message has been received by the originating facsimile machine from the terminating facsimile machine. If no DIS message has been received, then flow reverts back to step 406. If the second timer has expired at step 406, then flow proceeds to step 410, and an NSF message is sent to the originating facsimile machine as shown at reference numeral 208 in FIG. 2. The NSF or non standard facilities message generated by the FWT utilizes a manufacturer identification that will cause all facsimile machines to examine, and ultimately discard, the NSF message. Because the originating facsimile machine is forced to contend with the NSF message, it prevents the originating facsimile machine's connection timer from expiring. In addition, the NSF message does not alter the characteristics of the facsimile session. Although a preferred embodiment is described as including an NSF message, it will be appreciated by those skilled in the art that any "benign signal" (e.g. a signal or message that the originating facsimile machine must recognize and examine and which prevents the originating facsimile machine's connection timer from expiring, without altering the characteristics of the facsimile session) could be substituted for the NSF message without departing from the spirit and scope of the appended claims. For example, one skilled in the art would recognize that any benign HDLC message could be substituted for the NSF message. In addition, select facsimile machines may allow a benign tonal message, such as a called or CED tonal message, to be substituted for the NSF message.

Figure 2:
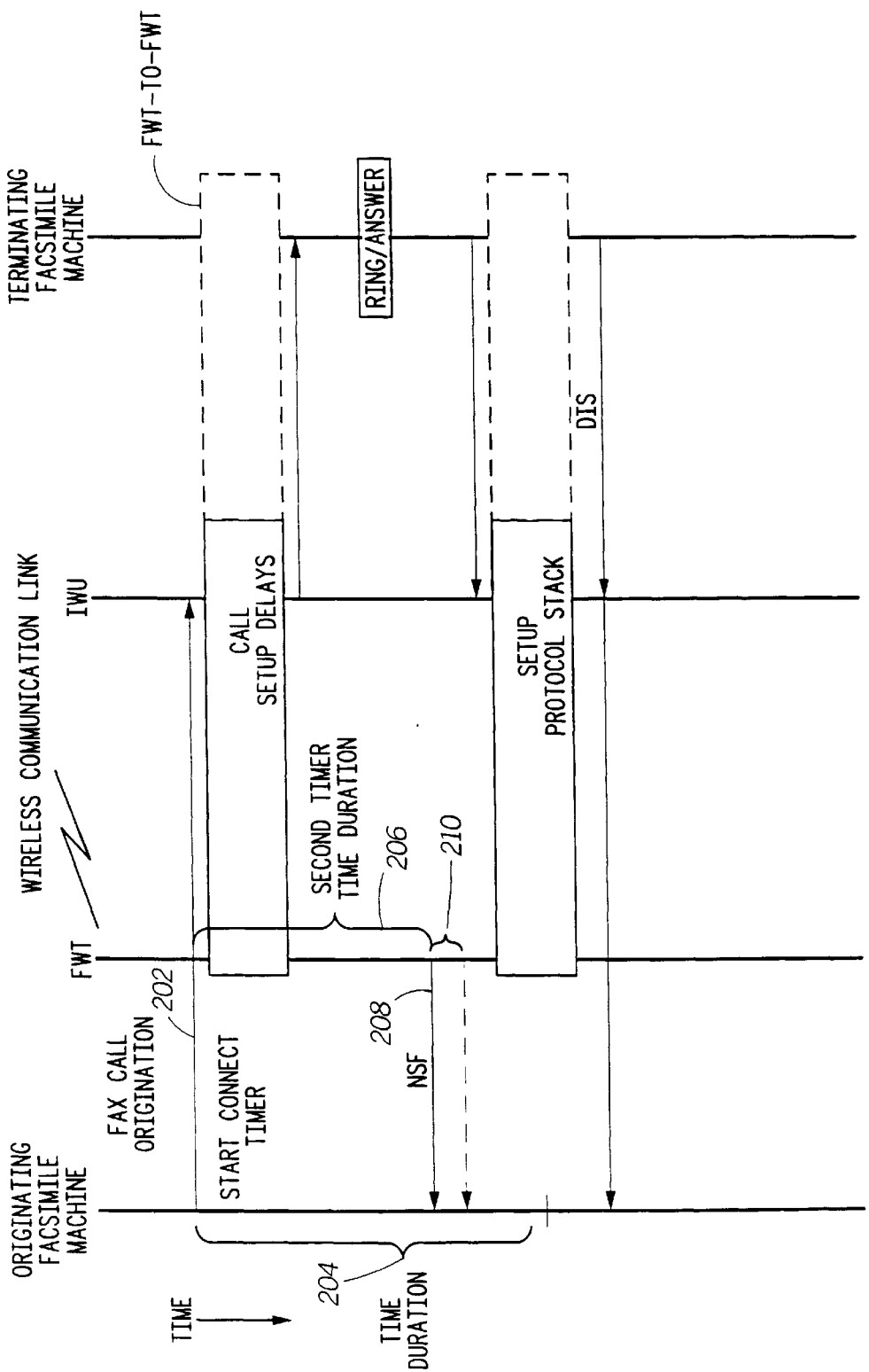
FIG. 2 is a call flow diagram illustrating the operation of the facsimile telecommunications system of FIG. 1 in accordance with a preferred embodiment of the present invention, depicting when a call is placed from an originating facsimile machine to a terminating facsimile machine via a fixed wireless terminal communicating over an air interface to an inter working unit.

Next, a determination is made whether a DIS message has been received at block 412. If the DIS message has not been received by the originating facsimile machine at block 412, then a determination is made whether a predetermined maximum number of NSF message has been exceeded as illustrated at block 414 and as depicted in FIG. 2 at reference numeral 210. If the maximum number of NSF messages has not been exceeded, then the FWT sends additional NSF messages to the originating facsimile machine until either the maximum number of NSF messages has been exceeded, or the originating facsimile machine receives a DIS message from the terminating facsimile machine.

Figure 3:
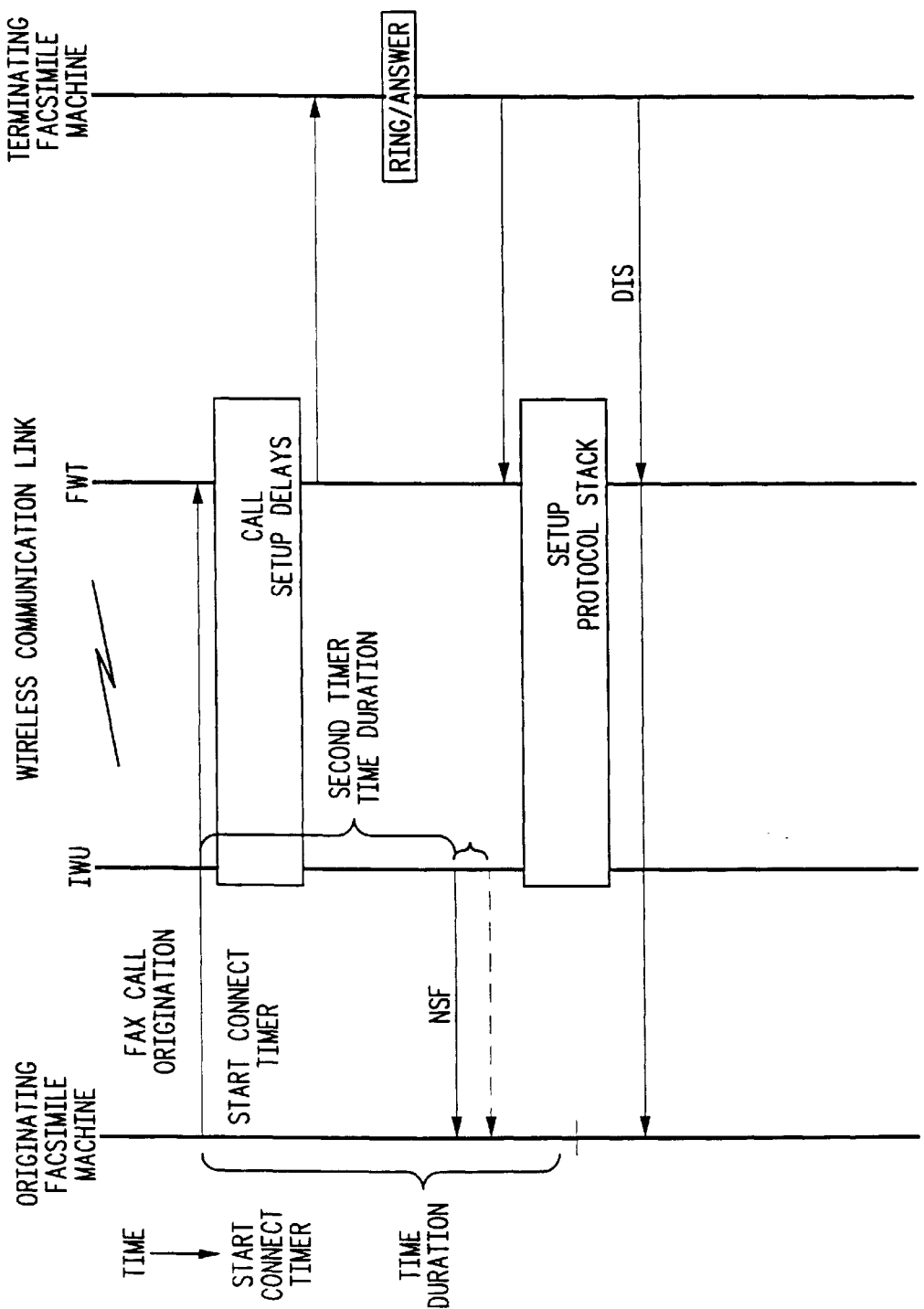
FIG. 3 is a call flow diagram illustrating the operation of the facsimile telecommunications system of FIG. 1 in accordance with a preferred embodiment of the present invention, depicting when a call is placed from an originating facsimile machine to a terminating facsimile machine via an inter working unit communicating over an air interface to a fixed wireless terminal.

With reference now to FIG. 3, there is depicted an alternate embodiment of the present invention wherein the originating facsimile machine is initially coupled to an interworking unit rather than to the fixed wireless terminal as shown in FIG. 2. Note that the interworking unit may detect the facsimile call origination from the originating facsimile machine and generate the NSF message in a manner similar to that shown in FIG. 2 and as described in a fixed wireless terminal.

In addition, it will be appreciated by those skilled in the art that additional delays are introduced into the system when the call attempt between the originating facsimile machine and the terminating facsimile machine is facilitated by one FWT to another FWT (i.e. wireless to wireless).

The foregoing description of a preferred embodiment of the invention has been presented for the purpose of illustration and description. It is not intended to be exhaustive or to limit the invention to the precise form disclosed. Modifications or variations are possible in light of the above teachings. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method of preventing an originating facsimile machine from going on hood due to setup delays, the originating facsimile machine including a start connect timer having a predetermined time duration, comprising the steps of:

detecting a facsimile call origination from the originating facsimile machine;

anticipating expiration of the start connect timer; and sending, from a fixed wireless terminal, a benign signal to the originating facsimile machine prior to expiration of the start connect timer, wherein the benign signal allows the originating facsimile machine to receive a digital identification signal message from a terminating facsimile machine prior to expiration of the start connect timer.

2. A method as recited in claim 1, wherein the step of anticipating includes initializing a second timer in response to the facsimile call origination, the second timer having a predetermined time duration less than that of the start connect timer time duration.

3. A method as recited in claim 1, wherein the step of sending further includes sending a tonal message.

4. A method as recited in claim 1, wherein the step of sending further includes sending, from an interworking unit, a benign signal to the originating facsimile machine prior to expiration of the start connect timer.

5. A method as recited in claim 1, further including the step of determining whether a predetermined maximum number of benign signals has been exceeded.

6. A method as recited in claim 1, wherein the step of sending further includes sending an HDLC message.

7. A method of preventing an originating facsimile machine from going on hook due to setup delays, the originating facsimile machine including a start connect timer having a predetermined time duration, comprising the steps of:

detecting a facsimile call origination from the originating facsimile machine;

in response to detecting a facsimile call origination, initializing a second timer having a predetermined time duration less than that of the first timer time duration; and sending, from a fixed wireless terminal, a benign signal to the originating facsimile machine after the time duration of the second timer expires but prior to the expiration of the start connect timer duration, wherein the benign signal allows the originating facisimile machine to receive a digital identification signal message from a terminating facsimile machine prior to expiration of the start connect timer.

8. A method as recited in claim 7, wherein the step of sending further includes sending an HDLC message.

9. A method as recited in claim 7, wherein the step of sending further includes sending a tonal message.

10. A method as recited in claim 7, wherein the step of sending further includes sending, from an interworking unit, a benign signal to the originating facsimile machine prior to expiration of the start connect timer.

11. A method as recited in claim 7, further including the step of determining whether a predetermined maximum number of benign signals has been exceeded.

12. An apparatus adapted to prevent an originating facsimile machine from going on hook due to setup delays, the originating facsimile machine including a start connect timer having a predetermined time duration, the apparatus comprising:

a facsimile call origination detector adapted to detect a facsimile call origination from the origination facsimile machine;

means for anticipating expiration of the start connect timer; and a benign signal sender adapted to send a benign signal to the origination facsimile machine prior to expiration of the start connect timer, wherein the benign signal allows the originating facsimile machine to receive a digital identification signal message from a terminating facsimile machine prior to expiration of the start connect timer, the apparatus being a fixed wireless terminal.

13. An apparatus as recited in claim 12, further including a controller adapted to determine whether a predetermined maximum number of benign signals has been exceeded.

14. An apparatus as recited in claim 12, wherein the benign signal comprises an HDLC message.

15. An apparatus as recited in claim 12, wherein anticipating includes a second timer adapted to be initialized in response to the facsimile call origination, the second timer having a predetermined time duration less than that of the start connect timer time duration.

16. An apparatus as recited an claim 12, wherein the benign signal comprises a tonal message.

* * * * *